United States Patent
Ko et al.

(10) Patent No.: US 11,888,656 B2
(45) Date of Patent: Jan. 30, 2024

(54) EQUALIZER, OPERATING METHOD OF EQUALIZER AND SYSTEM INCLUDING EQUALIZER

(71) Applicant: Samsung Electronics Co., Ltd., Suwon-si (KR)

(72) Inventors: Kyeongjoon Ko, Yongin-si (KR); Hanseok Kim, Seoul (KR); Jaehyun Park, Seoul (KR); Junhan Bae, Hwaseong-si (KR); Gyeongseok Song, Hwaseong-si (KR); Jongjae Ryu, Changwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 41 days.

(21) Appl. No.: 17/834,262

(22) Filed: Jun. 7, 2022

(65) Prior Publication Data
US 2022/0400037 A1    Dec. 15, 2022

(30) Foreign Application Priority Data

Jun. 11, 2021  (KR) .................. 10-2021-0076248
Oct. 7, 2021  (KR) .................. 10-2021-0133449

(51) Int. Cl.
*H04L 25/03*    (2006.01)

(52) U.S. Cl.
CPC .. *H04L 25/03267* (2013.01); *H04L 25/03121* (2013.01); *H04L 25/03146* (2013.01); *H04L 2025/0349* (2013.01)

(58) Field of Classification Search
CPC ......... H04L 25/03267; H04L 25/03121; H04L 25/03146; H04L 2025/0349
See application file for complete search history.

(56) References Cited

U.S. PATENT DOCUMENTS

| | | | |
|---|---|---|---|
| 6,707,850 B1 | 3/2004 | Blake et al. | |
| 8,842,722 B2 | 9/2014 | Dickson et al. | |
| 8,953,669 B2 | 2/2015 | Amamiya | |
| 9,083,577 B2* | 7/2015 | Maheshwari | H04L 25/03885 |
| 9,419,594 B2 | 8/2016 | Lee et al. | |
| 10,097,383 B1 | 10/2018 | Bulzacchelli et al. | |
| 10,848,353 B1 | 11/2020 | Dong et al. | |
| 2015/0229314 A1* | 8/2015 | Hata | H03L 7/0807 327/199 |
| 2016/0241421 A1* | 8/2016 | Lim | H04L 25/0272 |
| 2017/0295039 A1 | 10/2017 | Hidaka | |
| 2018/0248577 A1* | 8/2018 | Hossain | H04B 1/123 |

* cited by examiner

*Primary Examiner* — Janice N Tieu
(74) *Attorney, Agent, or Firm* — Harness, Dickey & Pierce, P.L.C.

(57) ABSTRACT

Provided is an equalizer including: an input amplifier configured to amplify and output an input signal; a first equalization circuit including a first sampling circuit, a first arithmetic circuit, and a second arithmetic circuit, the first sampling circuit being configured to generate and output 1-1 to 1-N feedback signals, wherein N is a natural number greater than or equal to 2; and a second equalization circuit including a second sampling circuit, a third arithmetic circuit, and a fourth arithmetic circuit, the second sampling circuit being configured to generate and output 2-1 to 2-M feedback signals, wherein M is a natural number greater than or equal to 2.

20 Claims, 7 Drawing Sheets

EQUALIZER, OPERATING METHOD OF EQUALIZER AND SYSTEM INCLUDING EQUALIZER

CROSS-REFERENCE TO RELATED APPLICATIONS

This application is based on and claims priority under 35 U.S.C. § 119 to Korean Patent Application Nos. 10-2021-0076248, filed on Jun. 11, 2021 and 10-2021-0133449, filed on Oct. 7, 2021, in the Korean Intellectual Property Office, the disclosures of which are incorporated by reference herein in their entirety.

BACKGROUND

The inventive concepts relate to an equalizer, and more particularly, to an equalizer in which each equalization circuit includes two arithmetic circuits.

Communication between devices or chips may be performed through an interface. During the communication process, a signal may be distorted and transmitted between the devices or chips. To compensate for such distortion of a signal, an interface may include an equalizer.

An equalizer may generate a plurality of feedback signals, and an operation of summing the plurality of feedback signals and an input signal may be performed through a summer. A summer may receive and sum the plurality of feedback signals and the input signal, and output a result of summation to a plurality of sense amplifiers. At this time, as the summer is connected to the plurality of sense amplifiers, an output node of the plurality of feedback signals, and an input node of the input signal, it may be difficult to sufficiently secure a bandwidth of the summer.

SUMMARY

The inventive concepts provide an equalizer capable of sufficiently securing a bandwidth of a summer included in an arithmetic circuit by using a plurality of arithmetic circuits.

According to an example embodiment of the inventive concepts, there is provided an equalizer including: an input amplifier configured to amplify and output an input signal; a first equalization circuit including a first sampling circuit configured to generate and output 1-1 to 1-N feedback signals, wherein N is a natural number greater than or equal to 2, a first arithmetic circuit, and a second arithmetic circuit; and a second equalization circuit including a second sampling circuit configured to generate and output 2-1 to 2-M feedback signals, wherein M is a natural number greater than or equal to 2, a third arithmetic circuit, and a fourth arithmetic circuit, wherein the first arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals, the second arithmetic circuit is configured to perform weighted summation of an output signal of the input amplifier, an output signal of the first arithmetic circuit, and the 2-1 feedback signal and outputs the weighted-summed output signal of the input amplifier, output signal of the first arithmetic circuit, and 2-1 feedback signal to the first sampling circuit, the third arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals, and the fourth arithmetic circuit is configured to perform weighted summation of the output signal of the input amplifier, an output signal of the third arithmetic circuit, and the 1-1 feedback signal and outputs the weighted-summed output signal of the input amplifier, output signal of the third arithmetic circuit, and 1-1 feedback signal to the second sampling circuit.

According to another example embodiment of the inventive concept, there is provided an operating method of an equalizer, the operating method includes: amplifying an input signal by an input amplifier; generating 1-1 to 1-N feedback signals through a first sampling circuit, wherein N is a natural number greater than or equal to 2; generating 2-1 to 2-M feedback signals through a second sampling circuit, wherein M is a natural number greater than or equal to 2; performing weighted summation of received feedbacks signals among the 1-2 to 1-N feedback signals and the 2-2 to 2-M feedback signals through a first arithmetic circuit; performing weighted summation of received feedbacks signals among the 1-2 to 1-N feedback signals and the 2-2 to 2-M feedback signals through a third arithmetic circuit; performing through a second arithmetic circuit weighted summation of an output signal of the input amplifier, an output signal of the first arithmetic circuit, and the 2-1 feedback signal and outputting the weighted-summed output signal of the input amplifier, output signal of the first arithmetic circuit, and 2-1 feedback signal to the first sampling circuit; and performing through a fourth arithmetic circuit weighted summation of the output signal of the input amplifier, an output signal of the third arithmetic circuit, and the 1-1 feedback signal and outputting the weighted-summed output signal of the input amplifier, output signal of the third arithmetic circuit, and 1-1 feedback signal to the second sampling circuit.

According to another example embodiment of the inventive concept, there is provided a system including: a host device; a memory device configured to operate based on a request received from the host device; and an interface configured to provide communication between the host device and the memory device and including an equalizer, wherein the equalizer includes: an input amplifier configured to amplify and output an input signal; a first equalization circuit including a first sampling circuit configured to generate and output 1-1 to 1-N feedback signals, wherein N is a natural number greater than or equal to 2, a first arithmetic circuit, and a second arithmetic circuit; and a second equalization circuit including a second sampling circuit configured to generate and output 2-1 to 2-M feedback signals, wherein M is a natural number greater than or equal to 2, a third arithmetic circuit, and a fourth arithmetic circuit, wherein the first arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals, the second arithmetic circuit is configured to perform weighted summation of an output signal of the input amplifier, an output signal of the first arithmetic circuit, and the 2-1 feedback signal and outputs the weighted-summed output signal of the input amplifier, output signal of the first arithmetic circuit, and 2-1 feedback signal to the first sampling circuit, the third arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals, and the fourth arithmetic circuit is configured to perform weighted summation of the output signal of the input amplifier, an output signal of the third arithmetic circuit, and the 1-1 feedback signal and outputs the weighted-summed output signal of the input amplifier, output signal of the third arithmetic circuit, and 1-1 feedback signal to the second sampling circuit.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EXAMPLE EMBODIMENTS

Hereinafter, example embodiments of the inventive concepts will be described in detail with reference to the accompanying drawings.

Figure 1:
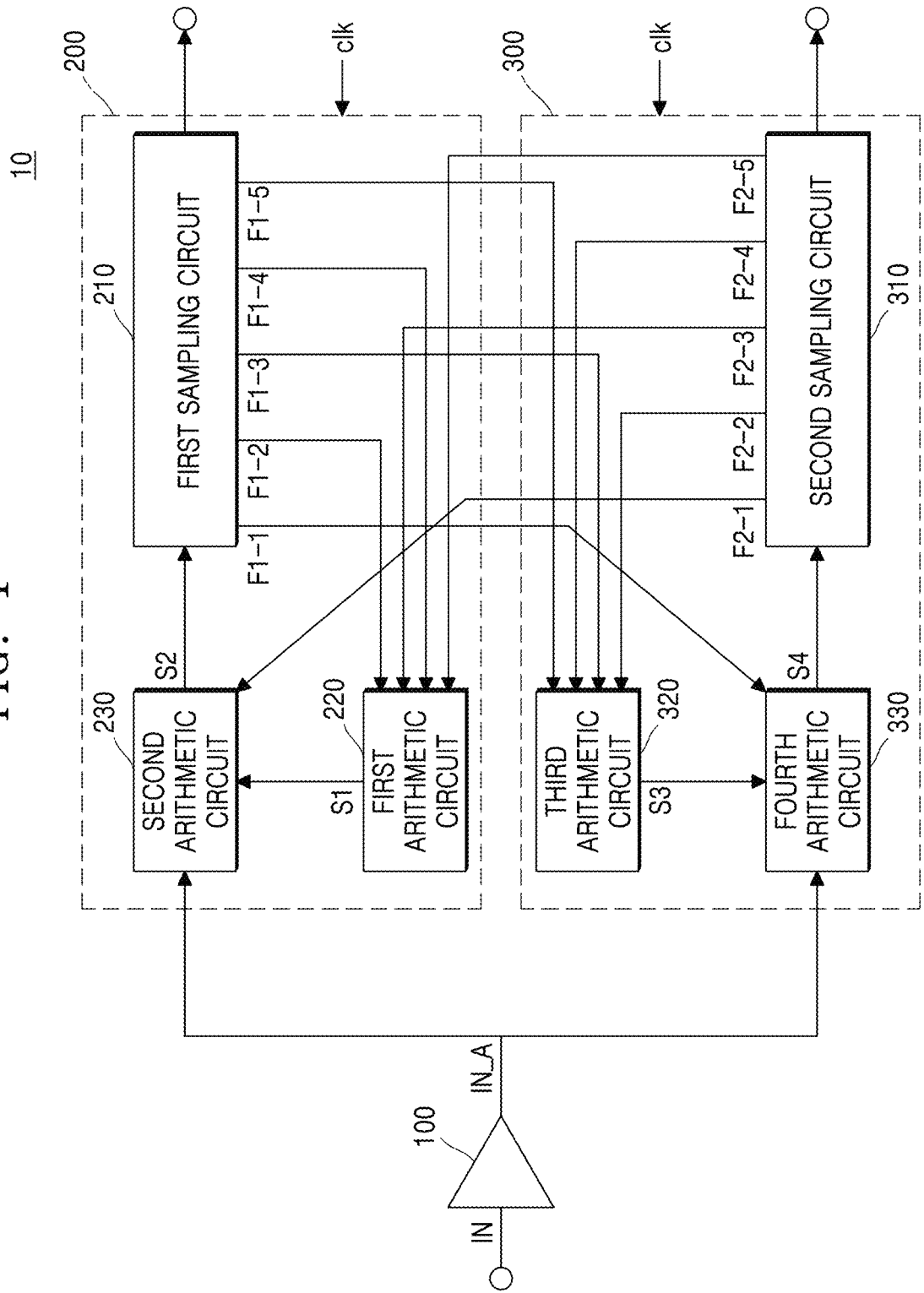
FIG. 1 is a diagram illustrating an equalizer according to an example embodiment.

FIG. 1 is a diagram illustrating an equalizer according to an example embodiment.

With reference to FIG. 1, an equalizer 10 according to an example embodiment of the inventive concepts may include an input amplifier 100, a first equalization circuit 200, and a second equalization circuit 300.

The input amplifier 100 may amplify and output an input signal IN. More specifically, the input amplifier 100 may receive an input signal IN input from the outside. The input amplifier 100 may amplify the received input signal IN. Further, the input amplifier 100 may output an amplified input signal IN_A to the first equalization circuit 200 and the second equalization circuit 300.

The first equalization circuit 200 may include a first sampling circuit 210, a first arithmetic circuit 220, and a second arithmetic circuit 230.

The first sampling circuit 210 may include a plurality of sense amplifiers and a plurality of latches. The first sampling circuit 210 may generate and output 1-1 to 1-N feedback signals (N is a natural number greater than or equal to 2) through the plurality of sense amplifiers and the plurality of latches.

The first sampling circuit 210 may output a 1-1 feedback signal F1-1 to a fourth arithmetic circuit 330 described later. Further, the first sampling circuit 210 may output to the first arithmetic circuit 220 1-α feedback signals (a represents any even number greater than or equal to 2 and less than or equal to N) among 1-2 to 1-N feedback signals, and output to a third arithmetic circuit 320 1-c feedback signals (c represents any odd number greater than 2 and less than or equal to N). For example, when N=5, the first sampling circuit 210 may output to the first arithmetic circuit 220 a 1-2 feedback signal F1-2 and a 1-4 feedback signal F1-4, and output to the third arithmetic circuit 320 a 1-3 feedback signal F1-3 and a 1-5 feedback signal F1-5.

The first arithmetic circuit 220 may receive some of 1-2 to 1-N feedback signals and 2-2 to 2-M feedback signals (M is a natural number greater than or equal to 2). More specifically, the first arithmetic circuit 220 may receive the 1-α feedback signals from the first sampling circuit 210. Further, the first arithmetic circuit 220 may receive 2-b feedback signals (b represents any odd number greater than 2) from a second sampling circuit 310 described later. For example, when N=5 and M=5, the first arithmetic circuit 220 may receive from the first sampling circuit 210 the 1-2 feedback signal F1-2 and the 1-4 feedback signal F1-4 and receive from the second sampling circuit 310 a 2-3 feedback signal F2-3 and a 2-5 feedback signal F2-5.

The first arithmetic circuit 220 may include a summer and a plurality of multipliers. The first arithmetic circuit 220 may perform weighted summation of received feedback signals using the summer and the plurality of multipliers. Also, the first arithmetic circuit 220 may output a result of weighted summation to the second arithmetic circuit 230.

The second arithmetic circuit 230 may receive an output signal IN_A of the input amplifier 100 and an output signal S1 of the first arithmetic circuit 220. Further, the second arithmetic circuit 230 may receive a 2-1 feedback signal F2-1 from the second sampling circuit 310.

The second arithmetic circuit 230 may include a summer and a plurality of multipliers. The second arithmetic circuit 230 may perform weighted summation of the output signal IN_A of the input amplifier 100, the output signal S1 of the first arithmetic circuit 220, and the 2-1 feedback signal F2-1 using the summer and the plurality of multipliers. Also, the second arithmetic circuit 230 may output a result of weighted summation to the first sampling circuit 210.

At this time, the second arithmetic circuit 230 may not receive all of the 1-α feedback signals, the 2-1 feedback signal F2-1, and the 2-b feedback signals, and may only receive the 2-1 feedback signal F2-1. Further, the second arithmetic circuit 230 may receive a result of weighted summation of the 1-α feedback signals and the 2-b feedback signals from the first arithmetic circuit 220 and use the result of weighted summation. Accordingly, by reducing the load applied to the summer included the second arithmetic circuit 230, a sufficient bandwidth may be secured.

The second equalization circuit 300 may include the second sampling circuit 310, the third arithmetic circuit 320, and the fourth arithmetic circuit 330.

The second sampling circuit 310 may include a plurality of sense amplifiers and a plurality of latches. The second sampling circuit 310 generate and output 2-1 to 2-M feedback signals through the plurality of sense amplifiers and the plurality of latches.

The second sampling circuit 310 may output the 2-1 feedback signal F2-1 to the second arithmetic circuit 230. Further, the second sampling circuit 310 may output to the first arithmetic circuit 220 the 2-b feedback signals among the 2-2 to 2-M feedback signals, and output to the third arithmetic circuit 320 2-d feedback signals (d represents any even number greater than or equal to 2 and less than or equal to M). For example, when N=5, the second sampling circuit 310 may output to the first arithmetic circuit 220 the 2-3 feedback signal F2-3 and the 2-5 feedback signal F2-5, and output to the third arithmetic circuit 320 a 2-2 feedback signal F2-2 and a 2-4 feedback signal F2-4.

The third arithmetic circuit 320 may receive some of the 1-2 to 1-N feedback signals and 2-2 to 2-M feedback signals. More specifically, the third arithmetic circuit 320 may receive the 1-c feedback signals from the first sampling circuit 210. Also, the third arithmetic circuit 320 may receive the 2-d feedback signals from the second sampling circuit 310. For example, when N=5 and M=5, the third arithmetic circuit 320 may receive from the first sampling circuit 210 the 1-3 feedback signal F1-3 and the 1-5 feedback signal F1-5 and receive from the second sampling circuit 310 the 2-2 feedback signal F2-2 and the 2-4 feedback signal F2-4.

The third arithmetic circuit 320 may include a summer and a plurality of multipliers. The third arithmetic circuit 320 may perform weighted summation of received feedback signals using the summer and the plurality of multipliers. Also, the third arithmetic circuit 320 may output a result of weighted summation to the fourth arithmetic circuit 330.

The fourth arithmetic circuit 330 may receive an output signal IN_A of the input amplifier 100 and an output signal S3 of the third arithmetic circuit 320. Further, the fourth arithmetic circuit 330 may receive the 1-1 feedback signal F1-1 from the first sampling circuit 210.

The fourth arithmetic circuit 330 may include a summer and a plurality of multipliers. The fourth arithmetic circuit 330 may perform weighted summation of the output signal IN_A of the input amplifier 100, the output signal S3 of the third arithmetic circuit 320, and the 1-1 feedback signal F1-1 using the summer and the plurality of multipliers. Also, the fourth arithmetic circuit 330 may output a result of weighted summation to the second sampling circuit 310.

At this time, the fourth arithmetic circuit 330 may not receive all of the 1-c feedback signals, the 1-1 feedback signal F1-1, and the 2-d feedback signals, and may only receive the 1-1 feedback signal F1-1. Further, the fourth arithmetic circuit 330 may receive a result of weighted summation of the 1-c feedback signals and the 2-d feedback signals from the third arithmetic circuit 320 and use the result of weighted summation. Accordingly, by reducing the load applied to the summer included the fourth arithmetic circuit 330, a sufficient bandwidth may be secured.

The first equalization circuit 200 and the second equalization circuit 300 may receive a clock signal clk. The first equalization circuit 200 and the second equalization circuit 300 may operate based on the clock signal clk.

At this time, the first equalization circuit 200 may operate at a first edge of the clock signal clk and the second equalization circuit 300 may operate at a second edge of the clock signal clk. That is, the first sampling circuit 210, the first arithmetic circuit 220, and the second arithmetic circuit 230 included in the first equalization circuit 200 may operate at the first edge of the clock signal clk, and the second sampling circuit 310, the third arithmetic circuit 320, and the fourth arithmetic circuit 330 included in the second equalization circuit 300 may operate at the second edge of the clock signal clk.

In one example embodiment of the inventive concepts, the first edge may be a rising edge, and the second edge may be a falling edge. In another example embodiment of the inventive concepts, the first edge may be a falling edge, and the second edge may be a rising edge.

Specific structures of the first sampling circuit 210, the first arithmetic circuit 220, the second arithmetic circuit 230, the second sampling circuit 310, the third arithmetic circuit 320, and the fourth arithmetic circuit 330 may be described in more detail with reference to FIGS. 2 to 7. Hereinafter, each of circuits included in the equalizer 10 according to an example embodiment of the inventive concepts are described mainly focusing on an example embodiment where N=5 and M=5; however, the inventive concepts are not limited thereto.

Figure 2:
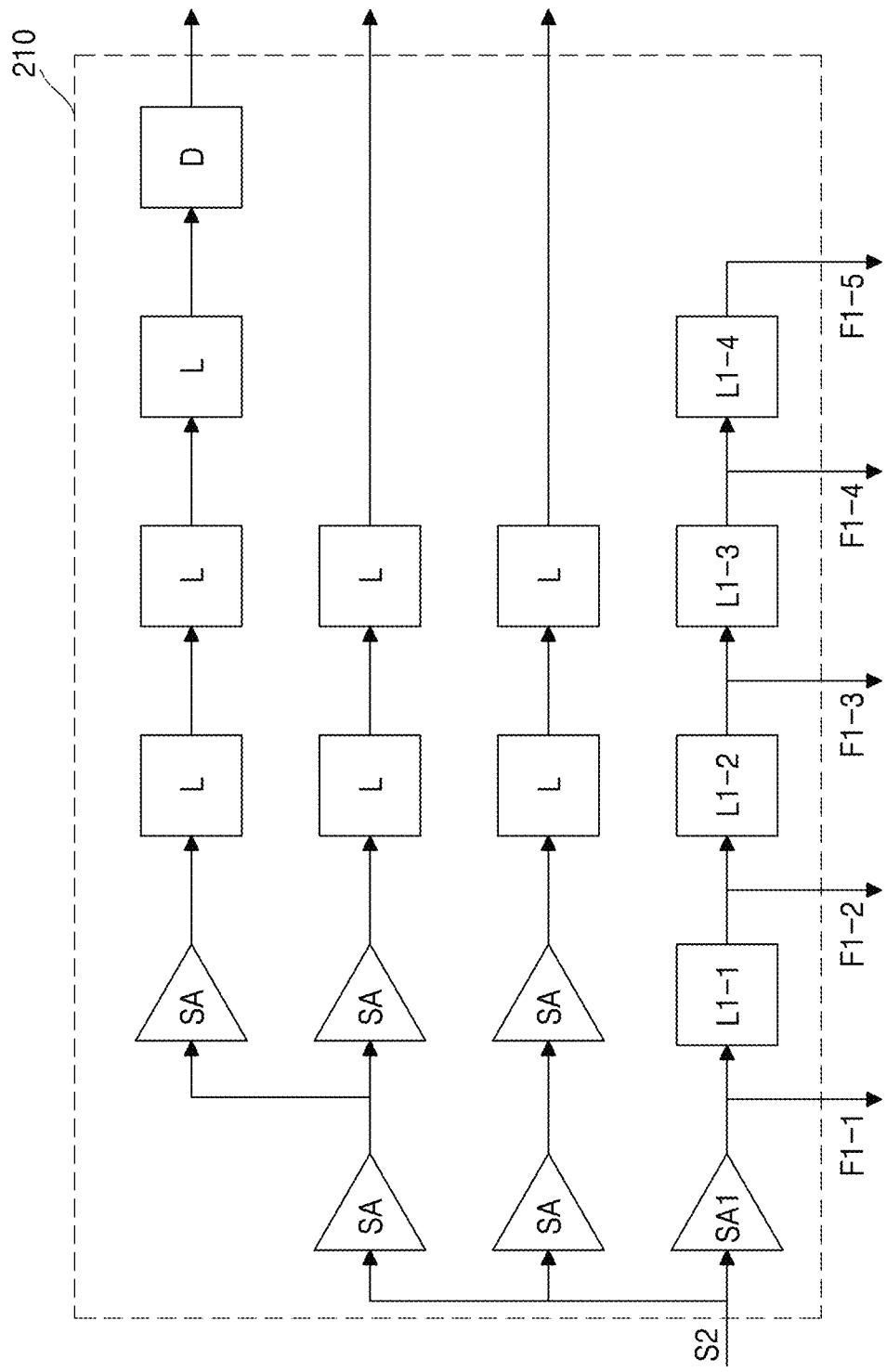
FIG. 2 is a diagram illustrating in more detail a first sampling circuit of an equalizer according to an example embodiment.

FIG. 2 is a diagram illustrating in more detail a first sampling circuit of an equalizer according to an example embodiment.

With reference to FIG. 2, the first sampling circuit 210 of the equalizer 10 according to an example embodiment of the inventive concepts may include a first sense amplifier SA1 and a plurality of first latches L1-1 to L1-4 (i.e., a 1-1 latch L1-1, a 1-2 latch L1-2, a 1-3 latch L1-3, and a 1-4 latch L1-4). In addition to this, the first sampling circuit 210 may further include a plurality of sense amplifiers SA, a plurality of latches L, and a D flip-flop D.

The first sense amplifier SA1 may amplify an output signal S2 of the second arithmetic circuit 230 to generate the 1-1 feedback signal F1-1. Further, the 1-1 feedback signal F1-1 generated by the first sense amplifier SA1 may be input to the plurality of first latches L1-1 to L1-4 and the fourth arithmetic circuit 330.

The plurality of first latches L1-1 to L1-4 may delay the 1-1 feedback signal F1-1 to generate 1-2 to 1-5 feedback signals.

More specifically, the plurality of first latches L1-1 to L1-4 may be connected in series. The number of the plurality of first latches L1-1 to L1-4 may be one less than the number of feedback signals generated by the first sampling circuit 210. For example, when the 1-1 to 1-5 feedback signals F1-1 to F1-5 are generated by the first sampling circuit 210, there may be four first latches L1-1 to L1-4.

The plurality of first latches L1-1 to L1-4 may include a 1-1 latch L1-1, a 1-2 latch L1-2, a 1-3 latch L1-3, and a 1-4 latch L1-4.

The 1-1 latch L1-1 may delay the 1-1 feedback signal F1-1 to generate the 1-2 feedback signal F1-2. The 1-2 feedback signal F1-2 may be input to the 1-2 latch L1-2 and the first arithmetic circuit 220.

The 1-2 latch L1-2 may delay the 1-2 feedback signal F1-2 to generate the 1-3 feedback signal F1-3. The 1-3 feedback signal F1-3 may be input to the 1-3 latch L1-3 and the third arithmetic circuit 320.

The 1-3 latch L1-3 may delay the 1-3 feedback signal F1-3 to generate the 1-4 feedback signal F1-4. The 1-4 feedback signal F1-4 may be input to the 1-4 latch L1-4 and the first arithmetic circuit 220.

The 1-4 latch L1-4 may delay the 1-4 feedback signal F1-4 to generate the 1-5 feedback signal F1-5. The 1-5 feedback signal F1-5 may be input to the third arithmetic circuit 320.

The first sampling circuit 210 may operate based on the clock signal clk. The clock signal clk may include a first clock signal and a second clock signal. At this time, the first sense amplifier SA1, the 1-2 latch L1-2, and the 1-4 latch L1-4 may operate based on the first clock signal. Also, the 1-1 latch L1-1 and the 1-3 latch L1-3 may operate based on the second clock signal.

At this time, the first sense amplifier SA1, the 1-2 latch L1-2, and the 1-4 latch L1-4 operating based on the first clock signal may generate the 1-1 feedback signal F1-1, the 1-3 feedback signal F1-3, and the 1-5 feedback signal F1-5. That is, the 1-1 feedback signal F1-1 and the 1-c feedback signals generated at the first equalization circuit 200 and input to the second equalization circuit 300 may be generated based on the first clock signal.

Further, the 1-1 latch L1-1 and the 1-3 latch L1-3 operating based on the second clock signal may generate the 1-2 feedback signal F1-2 and the 1-4 feedback signal F1-4. That is, the 1-α feedback signals generated at the first equalization circuit 200 and used in the first equalization circuit 200 may be generated based on the second clock signal.

The first sampling circuit 210 may generate an output of the equalizer 10 by using the plurality of sense amplifiers SA, the plurality of latches L, and the D flip-flop D.

Figure 3:
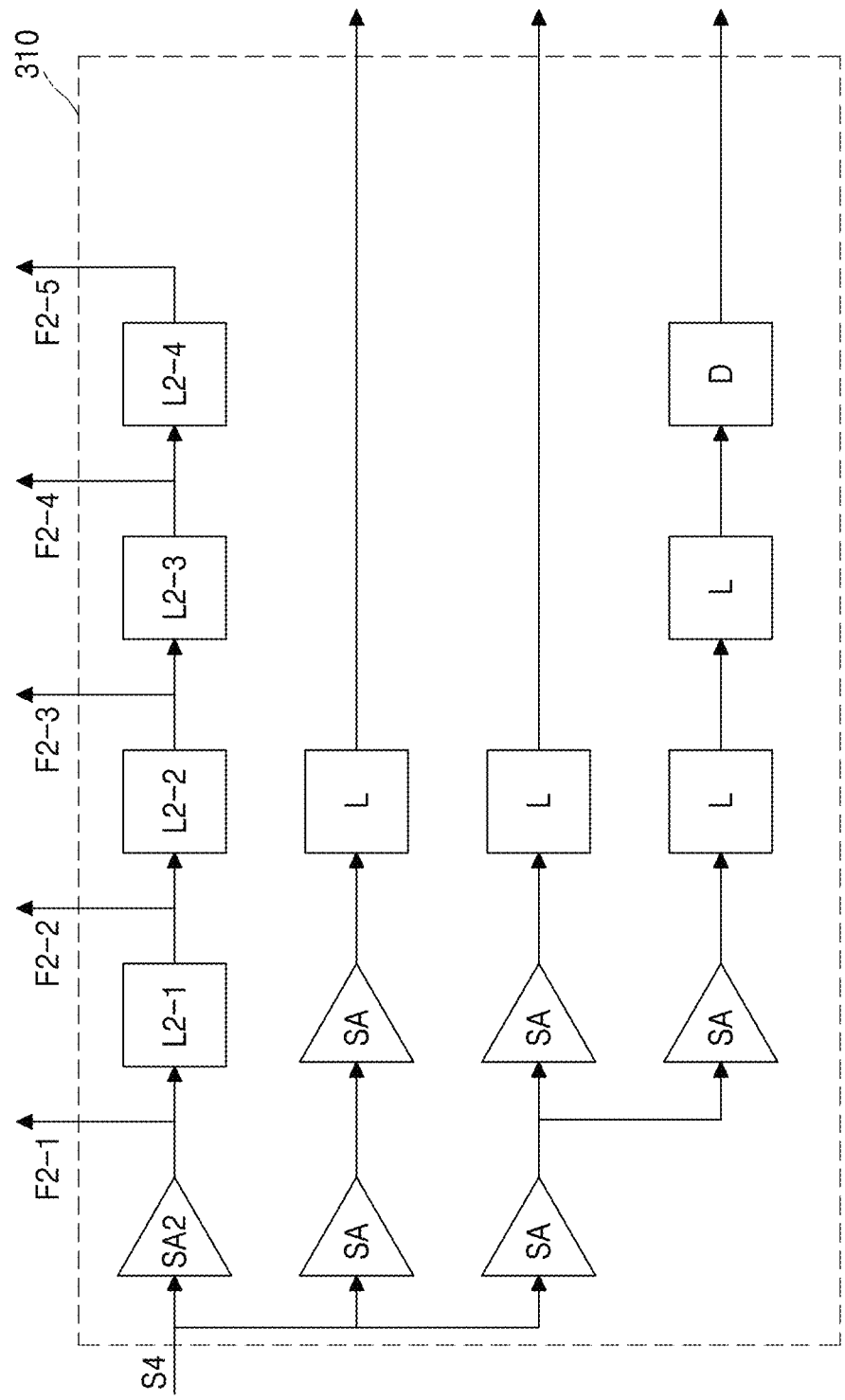
FIG. 3 is a diagram illustrating in more detail a second sampling circuit of an equalizer according to an example embodiment.

FIG. 3 is a diagram illustrating in more detail a second sampling circuit of an equalizer according to an example embodiment.

With reference to FIG. 3, the second sampling circuit 310 of the equalizer 10 according to an example embodiment of the inventive concepts may include a second sense amplifier SA2 and a plurality of second latches L2-1 to L2-4 (i.e., a 2-1 latch L2-1, a 2-2 latch L2-2, a 2-3 latch L2-3, and a 2-4 latch L2-4). In addition to this, the second sampling circuit 310 may further include a plurality of sense amplifiers SA, a plurality of latches L, and a D flip-flop D.

The second sense amplifier SA2 may amplify an output signal S4 of the fourth arithmetic circuit 330 to generate the 2-1 feedback signal F2-1. Further, the 2-1 feedback signal F2-1 generated by the second sense amplifier SA2 may be input to the plurality of second latches L2-1 to L2-4 and the second arithmetic circuit 230.

The plurality of second latches L2-1 to L2-4 may delay the 2-1 feedback signal F2-1 to generate 2-2 to 2-5 feedback signals.

More specifically, the plurality of second latches L2-1 to L2-4 may be connected in series. The number of the plurality of second latches L2-1 to L2-4 may be one less than the number of feedback signals generated by the second sampling circuit 310. For example, when the 2-1 to 2-5 feedback signals F2-1 to F2-5 are generated by the second sampling circuit 310, there may be four second latches L2-1 to L2-4.

The plurality of second latches L2-1 to L2-4 may include a 2-1 latch L2-1, a 2-2 latch L2-2, a 2-3 latch L2-3, and a 2-4 latch L2-4.

The 2-1 latch L2-1 may delay the 2-1 feedback signal F2-1 to generate the 2-2 feedback signal F2-2. The 2-2 feedback signal F2-2 may be input to the 2-2 latch L2-2 and the third arithmetic circuit 320.

The 2-2 latch L2-2 may delay the 2-2 feedback signal F2-2 to generate the 2-3 feedback signal F2-3. The 2-3 feedback signal F2-3 may be input to the 2-3 latch L2-3 and the first arithmetic circuit 220.

The 2-3 latch L2-3 may delay the 2-3 feedback signal F2-3 to generate the 2-4 feedback signal F2-4. The 2-4 feedback signal F2-4 may be input to the 2-4 latch L2-4 and the third arithmetic circuit 320.

The 2-4 latch L2-4 may delay the 2-4 feedback signal F2-4 to generate the 2-5 feedback signal F2-5. The 2-5 feedback signal F2-5 may be input to the first arithmetic circuit 220.

The second sampling circuit 310 may operate based on the clock signal clk. The clock signal clk may include a first clock signal and a second clock signal. At this time, the 2-1 latch L2-1 and the 2-3 latch L2-3 may operate based on the first clock signal. Also, the second sense amplifier SA2, the 2-2 latch L2-2, and the 2-4 latch L2-4 may operate based on the second clock signal.

At this time, the 2-1 latch L2-1 and the 2-3 latch L2-3 operating based on the first clock signal may generate the 2-2 feedback signal F2-2 and the 2-4 feedback signal F2-4. That is, the 2-d feedback signals generated at the second equalization circuit 300 and used in the second equalization circuit 300 may be generated based on the first clock signal.

Further, the second sense amplifier SA2, the 2-2 latch L2-2, and the 2-4 latch L2-4 operating based on the second clock signal may generate the 2-1 feedback signal F2-1, the 2-3 feedback signal F2-3, and the 2-5 feedback signal F2-5. That is, the 2-1 feedback signal F2-1 and the 2-b feedback signals generated at the second equalization circuit 300 and input to the first equalization circuit 200 may be generated based on the second clock signal.

To sum up the foregoing together with the descriptions with reference to FIG. 2, the feedback signals input to the first equalization circuit 200 may be generated based on the second clock signal, and the feedback signals input to the second equalization circuit 300 may be generated based on the first clock signal.

The second sampling circuit 310 may generate an output of the equalizer 10 by using the plurality of sense amplifiers SA, the plurality of latches L, and the D flip-flop D.

Figure 4:
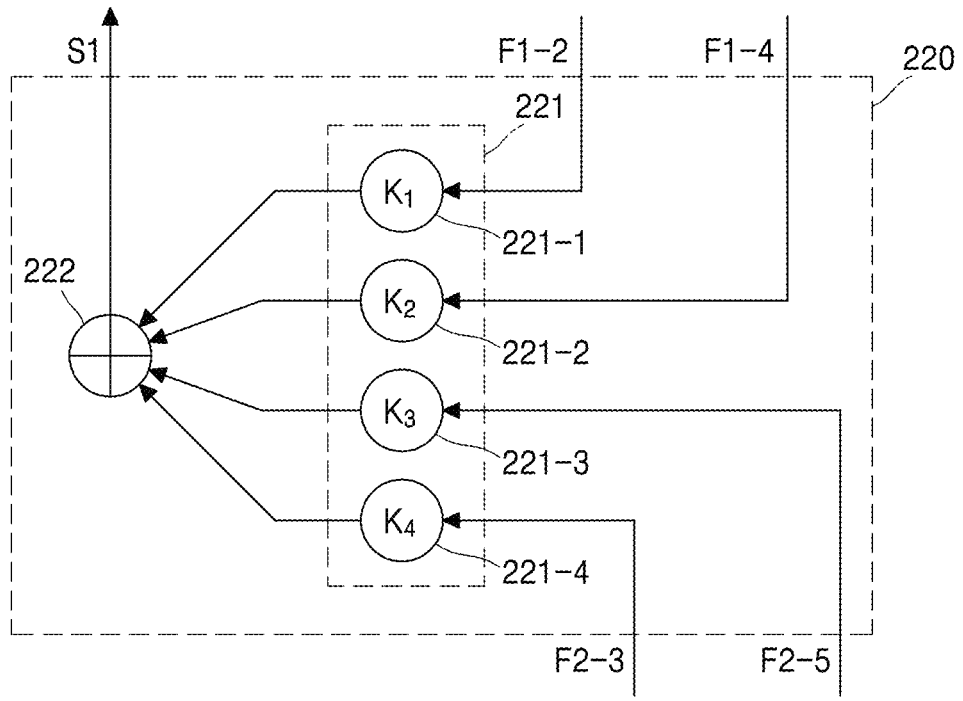
FIG. 4 is a diagram illustrating in more detail a first arithmetic circuit of an equalizer according to an example embodiment.

FIG. 4 is a diagram illustrating in more detail a first arithmetic circuit of an equalizer according to an example embodiment.

With reference to FIG. 4, the first arithmetic circuit 220 of the equalizer 10 according to an example embodiment of the inventive concepts may include a plurality of first multipliers 221 (i.e., a 1-1 multiplier 221-1, a 1-2 multiplier 221-2, a 1-3 multiplier 221-3, and a 1-4 multiplier 221-4) and a first summer 222. The first arithmetic circuit 220 may receive the 1-a feedback signals and the 2-b feedback signals. That is, the first arithmetic circuit 220 may receive the 1-2 feedback signal F1-2, the 1-4 feedback signal F1-4, the 2-3 feedback signal F2-3, and the 2-5 feedback signal F2-5.

The plurality of first multipliers 221 may multiply each of the 1-α feedback signals and the 2-b feedback signals by a coefficient. The number of the plurality of first multipliers 221 may be the same as the total number of the 1-α feedback signals and the 2-b feedback signals. In one example embodiment of the inventive concepts, the plurality of first multipliers 221 may include a 1-1 multiplier 221-1, a 1-2 multiplier 221-2, a 1-3 multiplier 221-3, and a 1-4 multiplier 221-4.

The 1-1 multiplier 221-1 may receive the 1-2 feedback signal F1-2 and multiply the 1-2 feedback signal F1-2 by a coefficient $K_1$ for output. The 1-2 multiplier 221-2 may receive the 1-4 feedback signal F1-4 and multiply the 1-4 feedback signal F1-4 by a coefficient $K_2$ for output. The 1-3 multiplier 221-3 may receive the 2-3 feedback signal F2-3 and multiply the 2-3 feedback signal F2-3 by a coefficient $K_3$ for output. The 1-4 multiplier 221-4 may receive the 2-5 feedback signal F2-5 and multiply the 2-5 feedback signal F2-5 by a coefficient $K_4$ for output.

The first summer 222 may sum output values of the plurality of first multipliers 221. That is, the first summer 222 may sum a product of the 1-2 feedback signal F1-2 and the coefficient $K_1$, a product of the 1-4 feedback signal F1-4 and the coefficient $K_2$, a product of the 2-3 feedback signal F2-3 and the coefficient $K_3$, and a product of the 2-5 feedback signal F2-5 and the coefficient $K_4$. Also, the first summer 222 may output a summation result S1 to the second arithmetic circuit 230.

Figure 5:
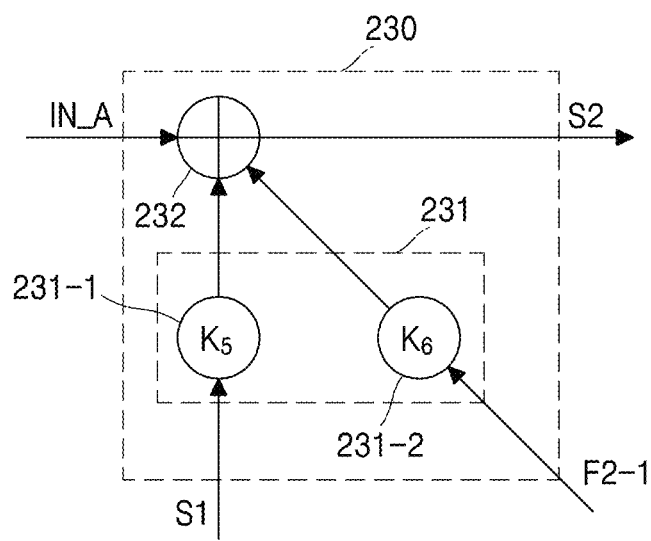
FIG. 5 is a diagram illustrating in more detail a second arithmetic circuit of an equalizer according to an example embodiment.

FIG. 5 is a diagram illustrating in more detail a second arithmetic circuit of an equalizer according to an example embodiment.

With reference to FIG. 5, the second arithmetic circuit 230 of the equalizer 10 according to an example embodiment of the inventive concepts may include a plurality of second multipliers 231 (i.e., a 2-1 multiplier 231-1 and a 2-2 multiplier 231-2) and a second summer 232. The second arithmetic circuit 230 may receive the output signal IN_A of the input amplifier 100, the output signal S1 of the first arithmetic circuit 220, and the 2-1 feedback signal F2-1.

The plurality of second multipliers 231 may multiply each of the output signal S1 of the first arithmetic circuit 220 and the 2-1 feedback signal F2-1 by a coefficient. The plurality of second multipliers 231 according to an example embodiment of the inventive concepts may include the 2-1 multiplier 231-1 and the 2-2 multiplier 231-2.

The 2-1 multiplier 231-1 may receive the output signal S1 of the first arithmetic circuit 220 and multiply the output signal S1 of the first arithmetic circuit 220 by a coefficient $K_5$ for output. The 2-2 multiplier 231-2 may receive the 2-1 feedback signal F2-1 and multiply the 2-1 feedback signal F2-1 by a coefficient $K_6$ for output.

The second summer 232 may sum the output signal IN_A of the input amplifier 100 and output values of the plurality of the second multipliers 231. That is, the second summer 232 may sum the output signal IN_A of the input amplifier 100, a product of the output signal S1 of the first arithmetic circuit 220 and the coefficient $K_5$, and a product of the 2-1 feedback signal F2-1 and the coefficient $K_6$. Also, the second summer 232 may output a summation result S2 to the first sampling circuit 210.

At this time, the second summer 232 may be connected to an output node of the input amplifier 100, an output node of the plurality of second multipliers 231, and an input node of the first sampling circuit 210. That is, the second summer 232 may not directly receive products of feedback signals used in the first equalization circuit 200 and a coefficient for summation, but receive only products of a coefficient and the 2-1 feedback signal F2-1, among the feedback signals used in the first equalization circuit 200, and a result of weighted summation of the rest of the feedback signals other than the 2-1 feedback signal F2-1, performed through the first arithmetic circuit 220. In this manner, the load applied to the second summer 232 may be reduced compared to the case where the second summer 232 directly receives all products of a coefficient and the feedback signals used in the first equalization circuit 200. Accordingly, by using the equalizer 10 according to an example embodiment of the inventive concepts, the load applied to the second summer 232 is decreased, and a sufficient bandwidth of the equalizer 10 may be secured. Also, the loading capacitance of the second summer 232 may also be decreased, which leads to a reduced operating time of the equalizer 10.

Figure 6:
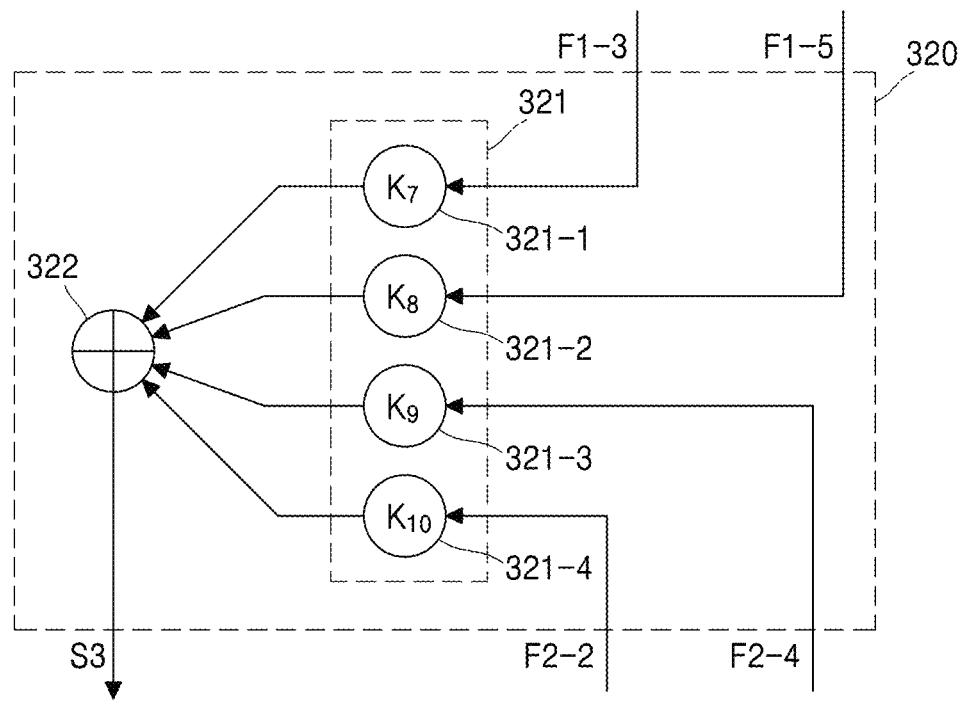
FIG. 6 is a diagram illustrating in more detail a third arithmetic circuit of an equalizer according to an example embodiment.

FIG. 6 is a diagram illustrating in more detail a third arithmetic circuit of an equalizer according to an example embodiment.

With reference to FIG. 6, the third arithmetic circuit 320 of the equalizer 10 according to an example embodiment of the inventive concepts may include a plurality of third multipliers 321 (i.e., a 3-1 multiplier 321-1, a 3-2 multiplier 321-2, a 3-3 multiplier 321-3, and a 3-4 multiplier 321-4) and a third summer 322. The third arithmetic circuit 320 may receive the 1-c feedback signals and the 2-d feedback signals. That is, the third arithmetic circuit 320 may receive the 1-3 feedback signal F1-3, the 1-5 feedback signal F1-5, the 2-2 feedback signal F2-2, and the 2-4 feedback signal F2-4.

The plurality of third multipliers 321 may multiply each of the 1-c feedback signals and the 2-d feedback signals by a coefficient. The number of the plurality of third multipliers 321 may be the same as the total number of the 1-c feedback signals and the 2-d feedback signals. In one example embodiment of the inventive concepts, the plurality of third multipliers 321 may include a 3-1 multiplier 321-1, a 3-2 multiplier 321-2, a 3-3 multiplier 321-3, and a 3-4 multiplier 321-4.

The 3-1 multiplier 321-1 may receive the 1-3 feedback signal F1-3 and multiply the 1-3 feedback signal F1-3 by a coefficient $K_7$ for output. The 3-2 multiplier 321-2 may receive the 1-5 feedback signal F1-5 and multiply the 1-5 feedback signal F1-5 by a coefficient $K_8$ for output. The 3-3 multiplier 321-3 may receive the 2-2 feedback signal F2-2 and multiply the 2-2 feedback signal F2-2 by a coefficient $K_9$ for output. The 3-4 multiplier 321-4 may receive the 2-4 feedback signal F2-4 and multiply the 2-4 feedback signal F2-4 by a coefficient $K_{10}$ for output.

The third summer 322 may sum output values of the plurality of third multipliers. That is, the third summer 322 may sum a product of the 1-3 feedback signal F1-3 and the coefficient $K_7$, a product of the 1-5 feedback signal F1-5 and the coefficient $K_8$, a product of the 2-2 feedback signal F2-2 and the coefficient $K_9$, and a product of the 2-4 feedback signal F2-4 and the coefficient $K_{10}$. Also, the third summer 322 may output a summation result S3 to the fourth arithmetic circuit 330.

Figure 7:
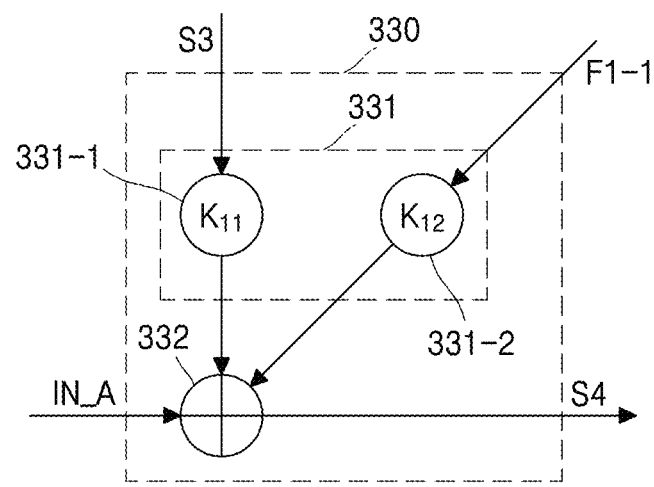
FIG. 7 is a diagram illustrating in more detail a fourth arithmetic circuit of an equalizer according to an example embodiment.

FIG. 7 is a diagram illustrating in more detail a fourth arithmetic circuit of an equalizer according to an example embodiment.

With reference to FIG. 7, the fourth arithmetic circuit 330 of the equalizer 10 according to an example embodiment of the inventive concepts may include a plurality of fourth multipliers 331 (i.e., a 4-1 multiplier 331-1 and a 4-2 multiplier 331-2) and a fourth summer 332. The fourth arithmetic circuit 330 may receive the output signal IN_A of the input amplifier 100, the output signal S3 of the third arithmetic circuit 320, and the 1-1 feedback signal F1-1.

The plurality of fourth multipliers 331 may multiply each of the output signal S3 of the third arithmetic circuit 320 and the 1-1 feedback signal F1-1 by a coefficient. The plurality of fourth multipliers 331 according to an example embodiment of the inventive concepts may include the 4-1 multiplier 331-1 and the 4-2 multiplier 331-2.

The 4-1 multiplier 331-1 may receive the output signal S3 of the third arithmetic circuit 320 and multiply the output signal S3 of the third arithmetic circuit 320 by a coefficient Ku for output. The 4-2 multiplier 331-2 may receive the 1-1 feedback signal F1-1 and multiply the 1-1 feedback signal F1-1 by a coefficient $K_{12}$ for output.

The fourth summer 332 may sum the output signal IN_A of the input amplifier 100 and output values of the plurality of the fourth multipliers 331. That is, the fourth summer 332 may sum the output signal IN_A of the input amplifier 100, a product of the output signal S3 of the third arithmetic circuit 320 and the coefficient $K_{11}$, and a product of the 1-1 feedback signal F1-1 and the coefficient $K_{12}$. Also, the fourth summer 332 may output a summation result S4 to the second sampling circuit 310.

At this time, the fourth summer 332 may be connected to the output node of the input amplifier 100, an output node of the plurality of fourth multipliers 331, and an input node of the second sampling circuit 310. That is, the fourth summer 332 may not directly receive products of feedback signals used in the second equalization circuit 300 and a coefficient for summation, but receive only products of a coefficient and the 1-1 feedback signal F1-1, among the feedback signals used in the second equalization circuit 300, and a result of weighted summation of the rest of the feedback signals other than the 1-1 feedback signal F1-1, performed through the third arithmetic circuit 320. In this manner, the load applied to the fourth summer 332 may be reduced compared to the case where the fourth summer 332 directly receives all products of a coefficient and the feedback signals used in the second equalization circuit 300. Accordingly, by using the equalizer 10 according to an example embodiment of the inventive concepts, the load applied to the fourth summer 332 is decreased, and a sufficient bandwidth of the equalizer 10 may be secured. Also, the loading capacitance of the fourth summer 332 may also be decreased, which leads to a reduced operating time of the equalizer 10.

Figure 8:
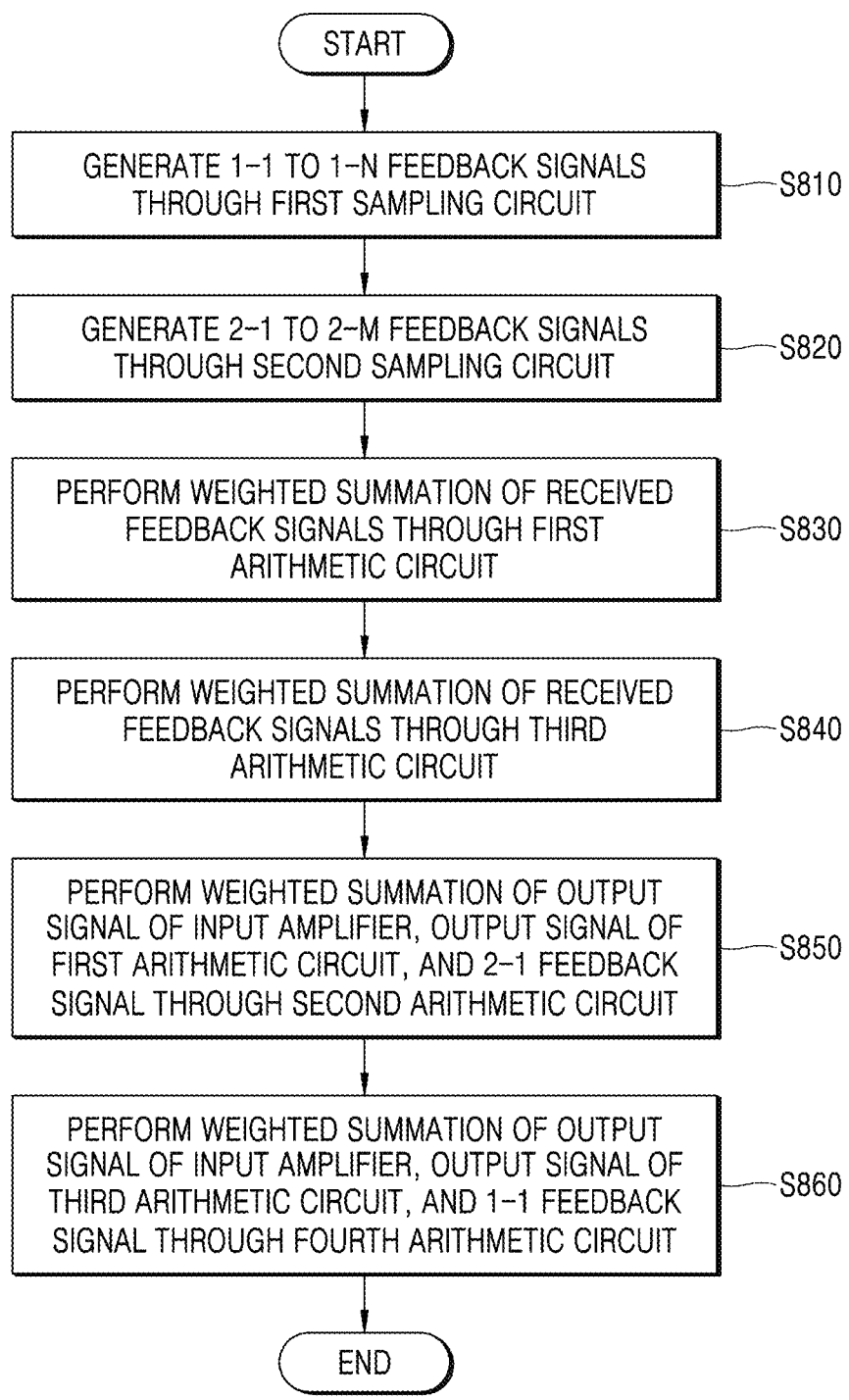
FIG. 8 is a flowchart illustrating an operating method of an equalizer according to an example embodiment.

FIG. 8 is a flowchart illustrating an operating method of an equalizer according to an example embodiment.

With reference to FIG. 8, the equalizer 10 may generate 1-1 to 1-N feedback signals through the first sampling circuit 210 (S810). The first sampling circuit 210 may generate the 1-1 to 1-N feedback signals by using the first sense amplifier SA1 and a plurality of first latches L1. At this time, an output signal of the first sampling circuit 210 may be input to at least one of the first arithmetic circuit 220, the third arithmetic circuit 320, and the fourth arithmetic circuit 330.

The equalizer 10 may generate 2-1 to 2-M feedback signals through the second sampling circuit 310 (S820). The second sampling circuit 310 may generate the 2-1 to 2-M feedback signals by using the second sense amplifier SA2 and a plurality of second latches L2. At this time, an output signal of the second sampling circuit 310 may be input to at least one of the first arithmetic circuit 220, the second arithmetic circuit 230, and the third arithmetic circuit 320.

The equalizer 10 may perform weighted summation of received feedback signals through the first arithmetic circuit 220 (S830). The first arithmetic circuit 220 may receive the 1-α feedback signals and the 2-b feedback signals, multiply a coefficient and each of the received feedback signals through the first multipliers 221, and sum output values of the first multipliers 221 through the first summer 222. At this time, the output signal S1 of the first arithmetic circuit 220 may be input to the second arithmetic circuit 230.

The equalizer 10 may perform weighted summation of received feedback signals through the third arithmetic circuit 320 (S840). The third arithmetic circuit 320 may receive the 1-c feedback signals and the 2-d feedback signals, multiply a coefficient and each of the received feedback signals through the third multipliers 321, and sum output values of the third multipliers 321 through the third summer 322. At this time, the output signal S3 of the third arithmetic circuit 320 may be input to the fourth arithmetic circuit 330.

The equalizer 10 may perform weighted summation of the output signal IN_A of the input amplifier 100, the output signal S1 of the first arithmetic circuit 220, and the 2-1 feedback signal F2-1 through the second arithmetic circuit 230 (S850). The second arithmetic circuit 230 may receive the output signal IN_A of the input amplifier 100, the output signal S1 of the first arithmetic circuit 220, and the 2-1 feedback signal F2-1, multiply each of the output signal S1 of the first arithmetic circuit 220 and the 2-1 feedback signal F2-1 by a coefficient through the plurality of second multipliers 231, and sum the output signal IN_A of the input amplifier 100 and output values of the plurality of second multipliers 231 through the second summer 232. At this time, the output signal S2 of the second arithmetic circuit 230 may be input to the first sampling circuit 210.

The equalizer 10 may perform weighted summation of the output signal IN_A of the input amplifier 100, the output signal S3 of the third arithmetic circuit 320, and the 1-1 feedback signal F1-1 through the fourth arithmetic circuit 330 (S860). The fourth arithmetic circuit 330 may receive the output signal IN_A of the input amplifier 100, the output signal S3 of the third arithmetic circuit 320, and the 1-1 feedback signal F1-1, multiply each of the output signal S3 of the third arithmetic circuit 320 and the 1-1 feedback signal F1-1 by a coefficient through the plurality of fourth multipliers 331, and sum the output signal IN_A of the input amplifier 100 and output values of the plurality of fourth multipliers 331 through the fourth summer 332. At this time, the output signal S4 of the fourth arithmetic circuit 330 may be input to the second sampling circuit 310.

Figure 9:
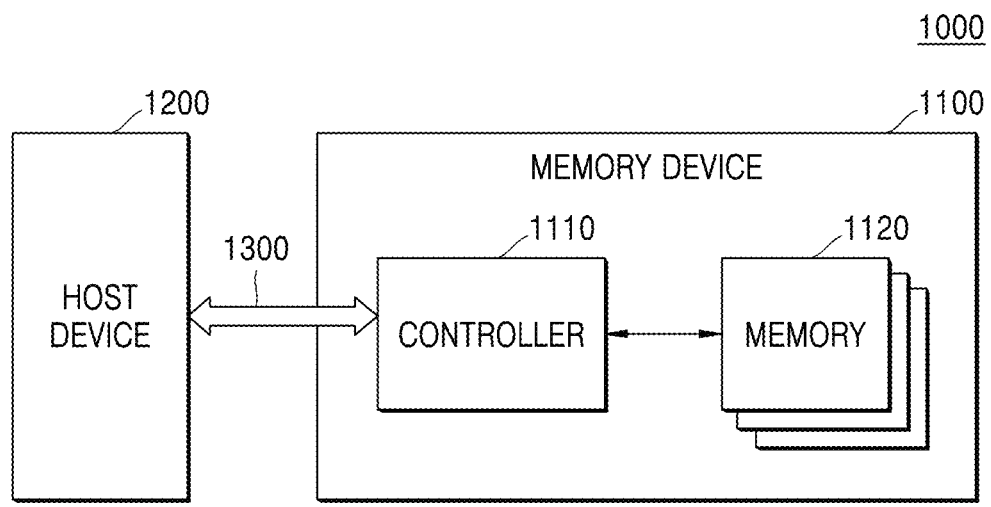
FIG. 9 is a diagram illustrating a system including an equalizer according to an example embodiment.

FIG. 9 is a diagram illustrating a system including an equalizer according to an example embodiment.

With reference to FIG. 9, a memory device 1100 and a host device 1200 may communicate via an interface 1300, and the memory device 1100 may include a controller 1110 and a memory 1120.

The interface 1300 may use an electric signal and/or an optical signal, and may be implemented by a serial advanced technology attachment (SATA) interface, a SATA express (SATAe) interface, a serial attached small computer system (SAS) interface (serial attached SCSI), a universal serial bus (USB) interface, or a combination thereof, but the inventive concepts are not limited thereto. The interface 1300 may include the equalizer 10 according to an example embodiment of the inventive concepts. Accordingly, the interface 1300 may secure sufficient bandwidth and reduce operating time.

In some example embodiments, the memory device 1100 may be removably coupled with the host device 1200 to communicate with the host device 1200. The memory 1120 may be non-volatile memory, and the memory device 1100 may be referred to as a storage system. For example, the memory device 1100 may be implemented by a solid-state drive or solid-state disk (SSD), an embedded SSD (eSSD), a multimedia card (MMC), an embedded multimedia card (eMMC), etc., but the inventive concepts are not limited thereto. The controller 1110 may control the memory 1120 in response to a request received from the host device 1200 through the interface 1300.

Figure 10:
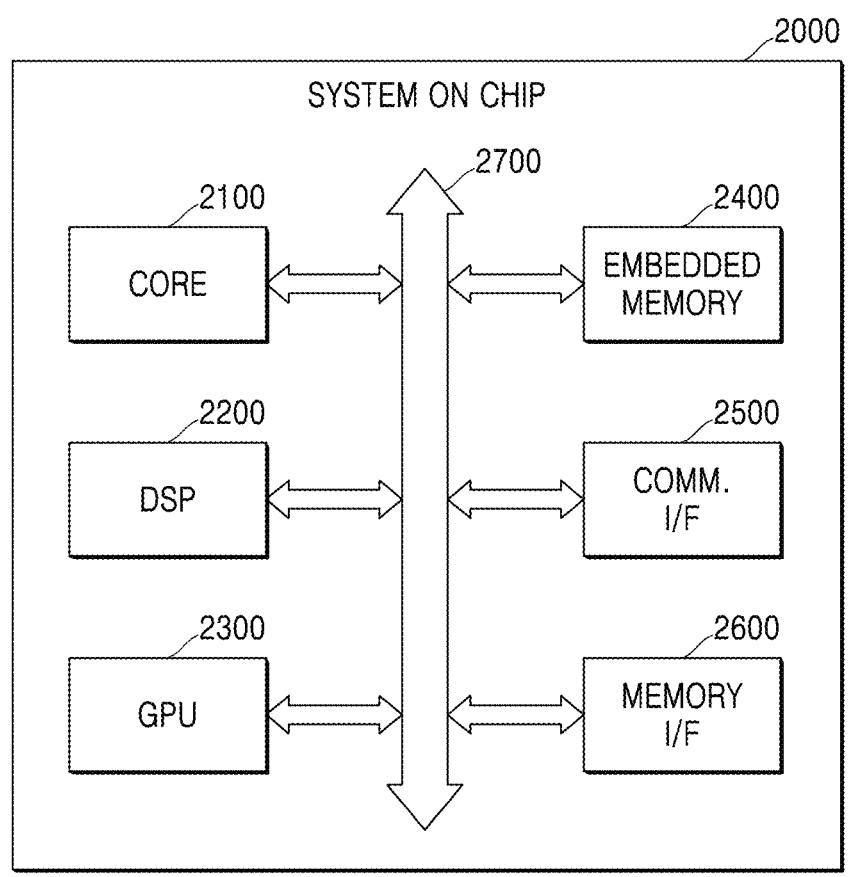
FIG. 10 is a diagram illustrating a System-on-Chip including an equalizer according to an example embodiment.

FIG. 10 is a diagram illustrating a System-on-Chip including an equalizer according to an example embodiment.

With reference to FIG. 10, a System-on-Chip (SoC) 2000 may refer to an integrated circuit in which components of a computing system or other electronic systems are integrated. For example, as one of the SoC 2000, an application processor (AP) may include a processor and components for other functions. As shown in FIG. 10, the SoC 2000 may include a core 2100, a digital signal processor (DSP) 2200, a graphic processing unit (GPU) 2300, an embedded memory 2400, a communication interface 2500, and a memory interface 2600. The components of the SoC 2000 may communicate with each other via a bus 2700.

The core 2100 may process commands and control operations of the components included in the SoC 2000. For example, the core 2100 may process a series of commands to run an operating system and execute application on the operating system. The DSP 2200 may process digital signals, for example, digital signals provided from the communication interface 2500 to generate useful data. The GPU 2300 may generate data for an image output through a display device from image data provided from the embedded memory 2400 or the memory interface 2600, and encode the image data. The embedded memory 2400 may store data required or desired to operate the core 2100, the DSP 2200, and the GPU 2300. The memory interface 2600 may provide an interface for an external memory of the SoC 2000, for example, dynamic random access memory (DRAM), flash memory, etc.

The communication interface 2500 may provide serial communication with the outside of the SoC 2000. For example, the communication interface 2500 may include the equalizer 10 according to an example embodiment of the inventive concepts for connection to the Ethernet. Accordingly, the communication interface 2500 may secure sufficient bandwidth and reduce operating time.

The core 2100, and the controller 1110, and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. An equalizer comprising:
    an input amplifier configured to amplify and output an input signal;
    a first equalization circuit including a first sampling circuit, a first arithmetic circuit, and a second arithmetic circuit, the first sampling circuit being configured to generate and output 1-1 to 1-N feedback signals, wherein N is a natural number greater than or equal to 2; and
    a second equalization circuit including a second sampling circuit, a third arithmetic circuit, and a fourth arithmetic circuit, the second sampling circuit being configured to generate and output 2-1 to 2-M feedback signals, wherein M is a natural number greater than or equal to 2,
    wherein the first arithmetic circuit is configured to perform weighted summation of received feedbacks signals among the 1-2 to 1-N feedback signals and the 2-2 to 2-M feedback signals and output the weighted-summed received feedbacks signals among the 1-2 to 1-N feedback signals and the 2-2 to 2-M feedback signals,
    the second arithmetic circuit is configured to perform weighted summation of an output signal of the input amplifier, an output signal of the first arithmetic circuit, and the 2-1 feedback signal and output the weighted-summed output signal of the input amplifier, output signal of the first arithmetic circuit, and 2-1 feedback signal to the first sampling circuit,
    the third arithmetic circuit configured to perform weighted summation of received feedbacks signals among the 1-2 to 1-N feedback signals and the 2-2 to 2-M feedback signals and output the weighted-summed received feedbacks signals among the 1-2 to 1-N feedback signals and the 2-2 to 2-M feedback signals, and
    the fourth arithmetic circuit is configured to perform weighted summation of the output signal of the input amplifier, an output signal of the third arithmetic circuit, and the 1-1 feedback signal and output the weighted-summed output signal of the input amplifier, output signal of the third arithmetic circuit, and 1-1 feedback signal to the second sampling circuit.

2. The equalizer of claim 1, wherein the first sampling circuit comprises:
    a first sense amplifier configured to amplify an output signal of the second arithmetic circuit to generate the 1-1 feedback signal; and
    a plurality of first latches configured to delay the 1-1 feedback signal to generate the 1-2 to 1-N feedback signals.

3. The equalizer of claim 1, wherein the second sampling circuit comprises:
    a first sense amplifier configured to amplify an output signal of the fourth arithmetic circuit to generate the 2-1 feedback signal; and
    a plurality of second latches configured to delay the 2-1 feedback signal to generate the 2-2 to 2-M feedback signals.

4. The equalizer of claim 1, wherein the first arithmetic circuit receives 1-$\alpha$ feedback signals, wherein a represents any even number greater than or equal to 2 and less than or equal to N and 2-b feedback signals, wherein b represents any odd number greater than 2 and less than or equal to M.

5. The equalizer of claim 4, wherein
    the second sampling circuit is configured to generate the 2-1 feedback signal based on a second clock signal,
    the first sampling circuit is configured to generate the 1-$\alpha$ feedback signals based on the second clock signal, and
    the second sampling circuit is further configured to generate the 2-b feedback signals based on the second clock signal.

6. The equalizer of claim 4, wherein the first arithmetic circuit comprises:
    a plurality of first multipliers configured to multiply each of the 1-$\alpha$ feedback signals and the 2-b feedback signals by a coefficient; and
    a first summer configured to sum output values of the plurality of first multipliers.

7. The equalizer of claim 1, wherein the second arithmetic circuit comprises:
    a plurality of second multipliers configured to multiply each of the output signal of the first arithmetic circuit and the 2-1 feedback signal by a coefficient; and
    a second summer configured to sum the output signal of the input amplifier and output values of the plurality of second multipliers.

8. The equalizer of claim 7, wherein the second summer is connected to an output node of the input amplifier, an output node of the plurality of second multipliers, and an input node of the first sampling circuit.

9. The equalizer of claim 1, wherein the third arithmetic circuit is configured to:
    perform weighted summation of
        1-c feedback signals, wherein c represents any odd number greater than 2 and less than or equal to N, and
        2-d feedback signals, wherein d represents any even number greater than or equal to 2 and less than or equal to M, and output the weighted-summed 1-c feedback signals and 2-d feedback signals.

10. The equalizer of claim 9, wherein
the first sampling circuit is configured to generate the 1-1 feedback signal and the 1-c feedback signals based on a first clock signal, and
the second sampling circuit is configured to generate the 2-d feedback signals based on the first clock signal.

11. The equalizer of claim 9, wherein the third arithmetic circuit comprises:
a plurality of third multipliers configured to multiply each of the 1-c feedback signals and the 2-d feedback signals by a coefficient; and
a third summer configured to sum output values of the plurality of third multipliers.

12. The equalizer of claim 1, wherein the fourth arithmetic circuit comprises:
a plurality of fourth multipliers configured to multiply each of the output signal of the third arithmetic circuit and the 1-1 feedback signal by a coefficient; and
a fourth summer configured to sum the output signal of the input amplifier and output values of the plurality of fourth multipliers.

13. The equalizer of claim 12, wherein the fourth summer is connected to an output node of the input amplifier, an output node of the plurality of fourth multipliers, and an input node of the second sampling circuit.

14. The equalizer of claim 1, wherein
the first equalization circuit and the second equalization circuit are configured to receive a clock signal,
the first equalization circuit is configured to operate at a first edge of the clock signal, and
the second equalization circuit is configured to operate at a second edge of the clock signal.

15. An operating method of an equalizer, the operating method comprising:
amplifying an input signal through an input amplifier;
generating 1-1 to 1-N feedback signals through a first sampling circuit, wherein N is a natural number greater than or equal to 2;
generating 2-1 to 2-M feedback signals through a second sampling circuit, wherein M is a natural number greater than or equal to 2;
performing, through a first arithmetic circuit, weighted summation of received feedback signals among the 1-2 to 1-N feedback signals and the 2-2 to 2-M feedback signals;
performing, through a third arithmetic circuit, weighted summation of received feedbacks signals among the 1-2 to 1-N feedback signals and the 2-2 to 2-M feedback signals;
performing, through a second arithmetic circuit, weighted summation of an output signal of the input amplifier, an output signal of the first arithmetic circuit, and the 2-1 feedback signal, and outputting the weighted-summed output signal of the input amplifier, output signal of the first arithmetic circuit, and 2-1 feedback signal to the first sampling circuit; and
performing, through a fourth arithmetic circuit, weighted summation of the output signal of the input amplifier, an output signal of the third arithmetic circuit, and the 1-1 feedback signal and outputting the weighted-summed output signal of the input amplifier, output signal of the third arithmetic circuit, and 1-1 feedback signal to the second sampling circuit.

16. The operating method of claim 15, wherein the second arithmetic circuit is connected to an output node of the input amplifier, an output node of the first arithmetic circuit, an output node of the 2-1 feedback signal of the second sampling circuit, and an input node of the first sampling circuit.

17. The operating method of claim 15, wherein the fourth arithmetic circuit is connected to an output node of the input amplifier, an output node of the third arithmetic circuit, an output node of the 1-1 feedback signal of the first sampling circuit, and an input node of the second sampling circuit.

18. The operating method of claim 15, wherein the equalizer receives a clock signal,
the first sampling circuit, the first arithmetic circuit, and the second arithmetic circuit operate at a first edge of the clock signal, and
the second sampling circuit, the third arithmetic circuit, and the fourth arithmetic circuit operate at a second edge of the clock signal.

19. A system comprising:
a host device;
a memory device configured to operate based on a request received from the host device; and
an interface including an equalizer, the interface being configured to provide communication between the host device and the memory device,
wherein the equalizer comprises:
an input amplifier configured to amplify and output an input signal;
a first equalization circuit including a first sampling circuit, a first arithmetic circuit, and a second arithmetic circuit, the first sampling circuit being configured to generate and output 1-1 to 1-N feedback signals, wherein N is a natural number greater than or equal to 2; and
a second equalization circuit including a second sampling circuit, a third arithmetic circuit, and a fourth arithmetic circuit, the second sampling circuit being configured to generate and output 2-1 to 2-M feedback signals, wherein M is a natural number greater than or equal to 2,
wherein the first arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals,
the second arithmetic circuit is configured to perform weighted summation of an output signal of the input amplifier, an output signal of the first arithmetic circuit, and the 2-1 feedback signal and outputs the weighted-summed output signal of the input amplifier, output signal of the first arithmetic circuit, and 2-1 feedback signal to the first sampling circuit,
the third arithmetic circuit is configured to perform weighted summation of received feedbacks signals among the 1-2 to 1-N feedback signals and the 2-2 to 2-M feedback signals and outputs the weighted-summed received feedbacks signals among the 1-2 to 1-N feedback signals and the 2-2 to 2-M feedback signals, and
the fourth arithmetic circuit is configured to perform weighted summation of the output signal of the input amplifier, an output signal of the third arithmetic circuit, and the 1-1 feedback signal and outputs the weighted-summed output signal of the input amplifier, output signal of the third arithmetic circuit, and 1-1 feedback signal to the second sampling circuit.

20. The system of claim 19, wherein the first equalization circuit and the second equalization circuit receive a clock signal,
   the first equalization circuit operates at a first edge of the clock signal, and
   the second equalization circuit operates at a second edge of the clock signal.

* * * * *